3,631,222
POLYARYLSULFONE GRAFT AND BLOCK COPOLYMERS WITH CHAINS OF POLYAMIDE ACID OR POLYIMIDE
Herward A. Vogel, Oakdale Township, Washington County, and Hans T. Oien, Lakeland, Minn., assignors to Minnesota Mining and Manufacturing Company, St. Paul, Minn.
No Drawing. Original application Mar. 22, 1967, Ser. No. 625,011. Divided and this application Jan. 2, 1970, Ser. No. 5,398
Int. Cl. C08g 41/04
U.S. Cl. 260—857 R
12 Claims

ABSTRACT OF THE DISCLOSURE

Certain linear thermoplastic polyarylsulfones having reactive groups thereon are disclosed. The reactive groups can recur along the polymer chains and/or can occur at the ends of the chains. In addition, segmented (graft and block) copolymers containing polyarylsulfone segments are disclosed. The linear and segmented polymers have wide areas of utility, e.g. in coatings, impregnants, films, filaments, molded articles, etc.

---

This is a division of application Ser. No. 625,011 filed Mar. 22, 1967, now abandoned.

BRIEF SUMMARY OF THE INVENTION

This invention relates to novel arylsulfone polymers.

In one aspect, the invention relates to linear thermoplastic polyarylsulfones having reactive groups thereon. In another aspect, the invention relates to segmented (graft and block) copolymers having arylsulfone main chains.

Although arylsulfone polymers have been known heretofore (e.g. see Belgian Pat. 639,636), their use has been restricted because of chemical inertness and high stability toward other reagents. The present invention provides linear arylsulfone polymers having reactive groups on the main chains thereof. Preferably, these are Zerewitinoff active hydrogen-containing groups, although polymers containing other groups, e.g. carbonyl or ethylenically unsaturated groups capable of undergoing addition reactions, are also envisioned. The linear polymers (this term being often used herein to refer to the linear and substantially linear polymers of the invention) can be further reacted through their reactive groups to other polymeric or monomeric materials. Thus, linear polymers containing recurring reactive groups can be further reacted to form graft copolymers having polyarylsulfone main chains and polymeric side chains. Also, the linear polymers having reactive terminal groups can be further reacted to form block copolymers containing polyarylsulfone blocks.

The linear polymers preferably contain no aliphatic carbon-carbon bonds in their main chains. They are often, but not necessarily, of relatively high molecular weight, e.g. having inherent viscosities (determined as 1 percent w./v. solutions in dimethylformamide as shown hereinafter) of not less than about 0.2 These high molecular weight linear polymers themselves are ordinarily strong and form relatively tough, flexible, orientable films and filaments and have low weight loss when heated to high temperatures. Other lower molecular weight polymers of the invention are utilized as prepolymers in the preparation of higher molecular weight final polymers.

It is an object of the invention to provide novel linear arylsulfone polymers having reactive groups thereon. It is another object of the invention to provide linear arylsulfone polymers having recurring reactive groups thereon. It is another object of the invention to provide linear arylsulfone polymers having terminal reactive groups thereon. It is another object of the invention to provide linear arylsulfone polymers which are wholly aromatic in character and which have reactive groups thereon. It is another object of the invention to provide linear polyarylsulfones containing reactive groups with Zerewitinoff active hydrogen. It is another object of the invention to provide linear polyarylsulfones containing carbonyl or ethylenically unsaturated groups capable of undergoing addition reactions. It is another object of the invention to provide graft copolymers having arylsulfone main chains. It is a further object of the invention to provide block copolymers containing polymeric arylsulfone blocks. Still other objects of the invention will become apparent to those skilled in the art from reading this specification.

DETAILED DESCRIPTION

The linear polymers of the invention are soluble, thermoplastic polyarylsulfones having reactive groups thereon. Frequently, although not necessarily, these reactive groups contain Zerewitinoff active hydrogen. Relative to the determination of active hydrogen by the Zerewitinoff method, reference is made to Ber. 40, 2026 (1907) and J. Am. Chem. Soc. 49, 2815 (1927). Among these reactive groups are primary amine, hydroxyl, carboxylic acid (and derivatives thereof, such as amide, nitrile and ester groups), sulfonic acid (and derivatives thereof, such as sulfonamides and sulfonic acid esters), mercaptan, etc., groups. Other reactive groups which can be present in the polymers of the invention in place or, or in addition to, those containing Zerewitinoff active hydrogen are, for example, carbonyl or ethylenically unsaturated groups (e.g. vinyl), etc.

The linear polymers of the invention are conveniently prepared from linear polyarylsulfones having carboxy anhydride groups therein. The preparation of such polymers is disclosed in our copending patent application, U.S. Ser. No. 541,124, filed Apr. 8, 1966, now Pat. No. 3,431,240. These precursor polymers contain recurring aromatic sulfone-anhydride units of the formula:

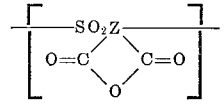

and/or terminal aromatic sulfone anhydride units of the formula:

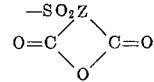

Z is a wholly or largely aromatic organic group which ordinarily contains no aliphatic carbon chains, but which may contain hetero atoms such as —O—, —S— or —CH$_2$— groups between aromatic rings. Ordinarily, each Z contains not more than about 30 carbon atoms (preferably not more than about 20 carbon atoms), and the carbonyl carbons of the anhydride groups thereon are bonded directly to aromatic ring carbon atoms. In a preferred class, the carbonyl carbons of each anhydride group are bonded to carbon atoms that are ortho to one another in the same aromatic ring. The precursor polymers containing the recurring anhydride groups may be made up largely or entirely of the groups set out above, but usually they also contain recurring groups of the formula:

and/or terminal groups of the type:

—SO$_2$R

The precursor polymers containing only terminal anhydride groups generally contain recurring groups of the type:

$$-[SO_2R]-$$

R is an aromatic structure (preferably entirely aromatic) ordinarily containing not more than about 20 carbon atoms. In the linear copolymers in which Z and R recur along the chain, they need not appear in any particular order. The aromatic structures Z and R can also be further substituted with small non-reactive substituents on the aromatic nuclei. Thus, the aromatic nuclei may additionally bear alkyl groups, such as methyl, ethyl, propyl, hexyl and the like; lower alkoxy groups, such as methoxy, ethoxy, butoxy, etc.; halogen atoms, such as chlorine or bromine, or other similar small substituents which are inert under the conditions of the polycondensation reaction. Most preferably, however, they contain no substituents.

The linear polymers of the present invention can be prepared from the anhydride-containing polyarylsulfone precursors by reacting the carboxy anhydride groups therein with an organic compound which contains two or more functional groups, at least one of which has active hydrogen thereon. The reaction involves opening of the anhydride ring and addition of the compound, e.g. as follows:

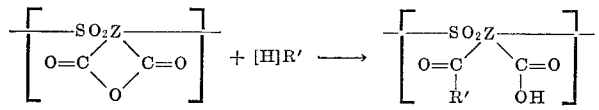

The terminal anhydride groups undergo an analogous reaction.

In the foregoing equation, [H] R′ is an organic compound in which [H] is active hydrogen which is preferably present in a hydroxyl or primary amine function. Where [H] is in an hydroxyl radical, an ester acid group is formed in the reaction shown above. Where [H] is in a primary amino group, the resulting link is an amide acid which can be converted by additional heating to a highly stable imide link.

Ordinarily, R′ is an aliphatic, aromatic or mixed aliphatic and aromatic organic group, and preferably it contains not more than about 20 carbon atoms. Preferably also, R′ contains but a single reactive group in addition to the one containing [H] in the compound [H] R′. It is possible, however, that R′ can contain two or even more reactive groups and these can be the same or different. The reactive groups in R′ are the same as those which occur in the linear polymers of the invention and these have been discussed previously.

The molar ratios of the reactive functions (in R′) to the sulfone groups in the linear polymers of the invention generally range from about .005 to 1. The reactive groups ordinarily have little effect at concentrations below this range, while the molar ratio of 1:1 represents a practical maximum in the preparation of the polymers. Preferably, the molar ratio of the reactive functions to the sulfone groups in the linear polymers of the invention ranges from about 1 to 30 percent. Normally, the linear polymers contain not more than about 30 percent nor less than about 10 percent by weight of sulfone groups. The linear polymers of the invention containing recurring reactive groups preferably have molar ratios (of the reactive groups to sulfone groups) ranging from about 1 to 30 percent while in those having only terminal reactive groups, the molar ratio thereof is preferably from about 1 to 15 percent. Often, except for the sulfone groups and the R′ groups, the linear polymers of the invention contain only carbon, hydrogen and oxygen and all of the rings therein are carbocycles.

Among the compounds of the type [H] R′ suitable for use in preparing the linear compounds of the invention are m- and p-amino phenol, m- and p-phenylene diamine, 4- amino-4′ - hydroxy phenyl ether, m- and p-aminophenyl phenol, p-aminobenzene sulfonic acid, o-, m- and p-aminobenzoic acid (and similar compounds in which the acid function is replaced by a derivative thereof such as nitrile, an amide or an ester of the sulfonic or carboxylic acid), aniline carrying carbonyl, aniline carrying ethylenic unsaturation (e.g. vinyl aniline), and trifunctional compounds such as 3,4 - diaminophenol, 3,4-diaminobenzoic acid, etc. Reference is made to U.S. Pat. 3,179,614, column 4, lines 58 through column 5, line 9 and column 5, line 64 through column 6, line 7 relative to other suitable diamines and solvents useful in the preparation of the linear polymers by reaction of amines with the anhydride groups of the precursors. Normal conditions and catalysts for the particular reaction involved in the preparation of a specific polymer of the invention can be used. Thus, when hydroxyl groups are so reacted, esterification conditions and catalysts can be used, when amine groups are reacted, suitable conditions for that reaction can be used, etc.

Immediate crosslinking (by reaction of two or more of the functions of the organic compound with anhydride groups on different polymer molecules) must be avoided in preparing the linear polymers of the invention. This usually presents no problem when the functional groups on the organic compound ([H] R′) are different from one another, since the conditions under which each will react with the anhydride groups ordinarily differ. Thus, a primary amine will react relatively easily with the anhydrides requiring only mixing in solution at room temperature or lower. The hydroxyl groups ordinarily require a basic catalyst (i.e. conversion of the hydroxyl group to an alkali derivative thereof, such as an ON a group) and heating, ordinarily at about 100° C. before reaction can take place.

Where two or more functions on the organic compound are the same (e.g. in the case of diamines, diols and dithiols), crosslinking can be avoided by adding a large stoichiometric excess of the organic compound. Once all of the anhydride groups present on the precursor polymer have reacted with an amine group, the excess of the organic compound can then be removed by ordinary means (such as by solvent extraction or evaporation). Another method of avoiding crosslinking in the preparation of the linear polymers of the invention is by blocking some (e.g. all but one) of the functions of the organic compound before mixing it with the precursor polymer. Thus, amine functions can be acetylated or otherwise blocked, hydroxyls can be esterified, etc. The functions can then be regenerated, as desired, after formation of the linear polymer of the invention.

The segmented copolymers of the invention are graft and block copolymers preferably comprising from about 25 to 99 percent by weight of at least one polyarylsulfone "A segment" and from about 1 to 75 percent by weight of at least one "B segment" which is different from the A segment. Preferably the B segment is produced from a stepwise polymerizable monomer, i.e. including ring opening and condensation type monomers). Preferably also the A segment contains at least ten arylsulfone units and the B segment contains at least six stepwise polymerizable monomeric units. Generally speaking, the segmented copolymers contain a plurality of segments. In the graft copolymers, the polyarylsulfone species is present in the main chain and the segments of the dissimilar polymerized species are present in the side chains; while in the block copolymers both types of segments are present in the main chain.

The segmented copolymers of the invention can be prepared from the linear polymers of the invention or directly from their anhydride-containing precursors. The graft copolymers and the block copolymers are prepared respectively from the linear arylsulfone polymers which have recurring and terminal functional groups thereon by means of further reactions through those functional groups. The arylsulfone chains of the linear polymers are not disturbed during these further reactions. The B segments in the segmented copolymers may include various types of polymers, usch as polyamide acids, polyimides, polyamides and polyesters as well as epoxy, phenolic, ethylene glycol prepolymers and many others. Preferred classes of the graft and block copolymers include those which have B segments which are respectively side chains and alternating blocks which are aromatic in nature, especially aromatic polyamide acids and polyimides.

The graft copolymers of the invention can be prepared by adding side chains to either the linear polymers of the invention or their linear anhydride-containing precursors by adding monomeric materials to the reactive sites thereof (thus forming the side chains in situ) or by adding previously formed polymeric side chains at the reactive sites of the same types of linear main chains. For example, a large excess of diamine can first be reacted with a linear polyarylsulfone having recurring anhydride groups thereon to form linear polymers of the invention with recurring primary amine groups, a large excess of diamines still being present. To this reaction mixture, a sufficient amount of an aromatic dianhydride compound (such as pyromellitic dianhydride) can then be added to balance stoichiometrically the free amine with the result that polyamide acid side chains are formed. Reference is made to U.S. Pat. 3,179,614, column 5, lines 10–48 and column 5, lines 49 through column 6 line, 7 for a list of dianhydrides which can be used for this purpose as well as solvents which are useful in the preparation of the copolymers. Upon further heating, these can be converted into polyimide side chains.

Similarly, polyester and other side chains can be formed on the linear polyarylsulfones which have recurring reactive groups thereon.

Normal conditions and catalysts for the particular reactions involved can be used where other types of side chains are prepared. Thus when hydroxyl groups are so reacted, polyesterification condtiions and catalysts can be used, etc.

A second method of preparing the graft copolymers of the invention involves the bonding of previously formed prepolymers to the backbone polyarylsulfone chain. Thus, prepolymers with hydroxyl end groups (such as polymers of ethyelne glycol, polyesters, epoxy resins and phenolic resins) or with amine end groups (such as polyamides or polyamide acid prepolymers made with excess amine) can be bonded to the anhydride groups of the precursor linear polyarylsulfones or to suitable linear polymers of the invention.

As will be appreciated by those skilled in the art, the techniques and reactions just discussed relative to the preparation of the graft copolymers can also be utilized in the preparation of the block copolymers. Thus, the block copolymers can be prepared by adding polymeric blocks to either the linear polymers of the invention which contain only terminal reactive groups or to the linear precursor polymers which contain only terminal anhydride groups by adding monomeric materials to the reactive sites thereof (thus forming the alternate polymeric blocks in situ) or by adding previously formed polymeric blocks at the terminal reactive sites of the same types of linear polymers.

Preferably, in the polymers of the present invention (whether they are the linear polymers containing recurring reactive groups, the linear polymers containing terminal reactive groups, the graft copolymers or the block copolymers) the reactive or polymeric structures which are joined to the main arylsulfone chains are joined thereto through oxygen or nitrogen atoms bonded directly to one or both carbonyl groups derived from the anhydride groups of the precursor (the resulting links having ester, amide acid or imide structures).

The linear polymers of the invention having Zerewitinoff active hydrogen-containing functional groups attached to the main polyarylsulfone chains through aromatic imide links form a particularly preferred class of the linear polymers since in them both the main chain and the link are highly stable. In addition, the graft copolymers of the invention having aromatic polyimide side chains and the block copolymers of the invention having aromatic polyimide alternating blocks, form preferred classes of the invention since the aromatic sulfone polymer, the polyimide chains and the structure connecting them are highly stable, both chemically and thermally.

The linear polymers, the graft copolymers and the block copolymers of the invention have many varied uses in numerous areas of application. Thus, they can be used as protecive coatings, impregnants, adhesives, as electrical insulating materials, etc. They can be fabricated into filaments, films, molded articles, etc. which have good mechanical properties. The linear polymers can be subsequently cured (crosslinked), the nature of the curing agent depending upon the reactive groups of the particular linear polymer. The cured linear polymers are strong and tough and very stable, both chemically and thermally. They can be used alone or filled with particulate or fibrous fillers or they can be used with glass fibers to form laminate structures. The crosslinked polymers, reinforced with glass fibers, provide particularly strong durable structures at high temperatures and have uses, for example, in such applications as ablative re-entry nose cones, etc.

The properties of the graft copolymers and block copolymers of the invention vary considerably depending upon the additional polymeric structure which is utilized with the basic polyarylsulfone structure. Block and graft copolymers in which the additional structure is that of an aromatic polyimide are useful under conditions of severe chemical thermal and mechanical attack, particularly as electrical insulating materials and as protective coatings. Those copolymers in which the additional polymeric structure is polyester or polyamide find uses in the form of filaments, films, molded articles, etc.

The following examples are intended to illustrate the present invention, but no limitations of its scope are implied thereby. The inherent viscosities of the polymers herein are determined utilizing a 1% w./v. solution of the polymer in dimethylformamide (1.0 gram of polymer per 100 ml. of solution) at 25° C., unless otherwise noted. The MIT fold endurance test utilized in the examples provides a measure of the toughness of the polymer tested, and is run as follows: A strip of the polymer from 1 to 2 mils (.001″) thick is subjected to repeated folding over a 270° angle under 1.5 kg. stress. The number of folding cycles withstood by the film before it breaks at the fold line is its degree of toughness. The heat resistance values of the polymers given in the examples are determined by thermal gravimetric analysis (TGA) tests run in the air at a temperature rise of 5° C. per minute. A weight loss of 10 percent or less in this test shows excellent stability of the polymer at the highest temperature used.

EXAMPLE 1

Preparation of a linear polyarylsulfone having recurring reactive hydroxyl groups thereon. Further reaction of the hydroxyl groups with epoxy groups in an epoxy prepolymer to form a graft copolymer.

A mixtue of 110.17 g. of diphenyl ether 4,4′-disulfonylchloride, 45.96 g. of diphenyl ether, 9.97 g. (5 mole %) of 4,5-diphenoxy phthalic anyhdride and 140 g. of nitrobenzene was placed in a 500 ml. 3-neck flask fitted with a mechanical stirrer and nitrogen-gas inlet and outlet. The preparation of 4,5-diphenoxy phthalic and anhydride is described in U.S. patent application Ser. No. 541,124, filed Apr. 8, 1966. The mixture was heated to 95° C. and 300 mg. of anhydrous ferric chloride catalyst was added to the stirred solution to initiate the polymerization. The temperature was raised to 123° within the polymerization. The temperature was raised to 123° within ½ hour and slow stirring of the reaction mixture under a slow stream of nitrogen was continued at this temperature for 30 hours. The viscous mass was diluted with 280 g. of dry dimethylacetamide to give a polymer solution of about 25% solids content. A small portion of this solution was precipitated in methanol and the recovered polymer extracted with a hot methanol/acetone mixture and dried. The inherent viscosity of the resulting linear polyarylsulfone having recurring carboxyl anhydride groups thereon was 0.58.

To 37 g. of this 25% polymeric solution was added 0.5 g. of p-aminophenol. The mixture was shaken for about 1 hour and then precipitated in methanol. The recovered polymer was extracted with hot methanol and dried. The polymer at this stage had acid amide groups carrying phenol groups recurring along the arylsulfone chains. The polymer was then heated for about 16 hours at 205° C. to form the linear polyarylsulfone having phthalimidophenol groups (i.e. groups containing aromatically bound hydroxyl groups) recurring thereon.

These recurring hydroxyl groups can be used as reactive sites for further condensation or crosslinking reactions with acid chlorides, epoxides, epoxy resins, and other reagents customarily used in phenolic resin chemistry. Thus, a mixture of 30 g. of the foregoing polymer containing recurring hydroxyl groups, 30 g. of an epoxy novolak polymer containing an average of about 3.6 epoxy groups per molecule (available from the Dow Chemical Co. under the trade designation DEN 438) and 25 g. of methyl nadic anhydride can be dissolved in 100 ml. of dimethylformamide and the resulting viscous resin solution used to prepare glass cloth laminates by first impregnating the glass cloth, evaporating the dimethylformamide solvent at 65° to 150° C. and then curing several layers of the impregnated cloth together under pressure at 205° C. The resulting laminate shows improved flexural modulus and aging stability at elevated temperatures (260° C.) over unmodified epoxy novolak laminates. Also, solvent extraction tests show that the cured resin mixture is completely insoluble, indicating that the hydroxyl group-containing sulfone polymer has participated in the reaction.

EXAMPLE 2

Preparation of a linear polyarylsulfone having recurring reactive primary amine groups thereon. Preparation from that of a graft copolymer having a polyarylsulfone main chain and polyamide acid side chains. Converting the polyamide acid side chains to polyimide side chains.

Phenyl ether disulfonyl chloride (74.55 g.), biphenyl (28.07 g.) biphenylmonosulfonyl chloride (50.55 g.), 4,5-diphenoxy phthalic anhydride (5.98 g.) and 135 g. of nitrobenzene were charged to a 500 ml. three-necked flask. The flask was purged with a slow stream of nitrogen and heated to 110° C. To the stirred solution was added 1.0 g. of an anhydrous indium trichloride catalyst. The evolution of hydrogen chloride became vigorous within 5 minutes and the gas was carried by the nitrogen to a water trap. The temperature was increased to 130° within 1 hour and then maintained at 130° for 24 hours. The inherent viscosity of the resulting linear polyarylsulfone having recurring carboxyl anhydride groups thereon was 0.34.

To a solution of 3.604 g. of oxydianiline in 43.8 g. of dimethylacetamide cooled to 5° C. was added with stirring 13.7 g. of the foregoing polymer as a 25% solids solution in nitrobenzene. This provided a stable solution of the linear polyarylsulfone having recurring reactive groups of the formula:

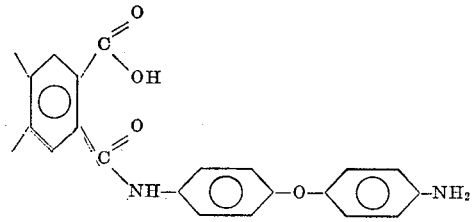

along the polymer chain (crosslinking having been prevented by the large excess of the oxydianiline added).

With continued cooling and stirring, 3.926 g. of pyromellitic dianhydride was added to the reaction mixture. The viscous mass obtained was diluted with 42 g. of dimethylacetamide and used for the casting of a film. The solvents were removed by drying the film at 65–260° C., allowing approximately 28° C. temperature increases during ½ hour periods. Conversion of the polyamic acid side chains to polyimides was also accomplished during this heating cycle. The film of polyarylsulfone-imide graft polymer thus prepared was clear and insoluble in dimethylacetamide. The clarity and insolubility of the film characterize the polymer as a graft copolymer since a blend of the polysulfone and the polyimide would produce an opaque and non-homogeneous film. Also, the film would remain soluble if the polymer had been a blend since the polyarylsulfone portion thereof would remain soluble. The film was also exceptionally tough and flexible. An average of 1550 folds was measured by the MIT fold endurance test on this film (1.0 mil thick). TGA tests in air indicated a weight loss of 10 percent at about 520° C.

EXAMPLE 3

Preparation of a linear polyarylsulfone having blocked terminal amine groups thereon. Unblocking of these groups and chain extension through them.

A mixture of 74.17 g. of diphenyl ether 4,4'-disulfonyl chloride, 50.55 g. of biphenylmonosulfonylchloride, 30.23 g. of biphenyl, and 180 g. of nitrobenzene was polymerized with 750 mg. indium trichloride catalyst using the procedure described in Example 2. After the polymerization had proceeded at 130° for 4½ hours, 2.88 g. of 4-phenoxy phthalic anhydride (prepared as described in U.S. patent application Ser. No. 541,124, filed Apr. 8, 1966) dissolved in 20 g. of nitrobenzene was added to the reaction mixture and heating was continued for another 20 hours. The resulting linear polymer was anhydride-terminated but contained no anhydride groups at intermediate positions along the chain.

This polymer solution was then degassed by application of vacuum and diluted with 200 g. of dimethylformamide. The solution was treated with 0.9 g. of p-aminoacetanilide. This provided sufficient amine groups to react with about half of the anhydride groups in the polymer, the resulting polymer thus having approximately equal numbers of terminal acetamide and anhydride groups. The solution was stirred for 30 minutes, precipitated in methanol, the recovered polymer was extracted with a hot acetone/methanol mixture and dried. It had an inherent viscosity of 0.25. The terminal acetamide groups in this polymer were, in effect, blocked amine groups which could be rendered reactive with the anhydride groups therein by heating the polymer to form the phthalimide group.

A sample of this polymer was heated at 315° C. for 45 minutes to effect the chain extension reaction. The inherent viscosity of the material increased to 0.45. Films cast of the original material were relatively weak and brittle, whereas the chain extended polymer gave tough and flexible films.

In a similar way, a linear anhydride-terminated polymer prepared as above could be reacted with a large excess of oxydianiline dissolved in dimethylacetamide to produce an amine-terminated polymer (the amine functionality thereof being about two). This polymer could then be dissolved in nitrobenzene and a small amount of pyridine and chain extended with isophthaloyl chloride (the latter being added to the stirred solution). Clear, flexible films could be cast from this material.

EXAMPLE 4

Preparation of a block copolymer consisting of polyarylsulfone and polyamide acid chain blocks. Converting the polyamide acid chain blocks to polyimide chain blocks.

A mixture of diphenyl ether disulfonyl chloride (77.12 g.), diphenyl ether (34.04 g.), 4-phenoxy phthalic anhydride (3.84 g.) and nitrobenzene solvent (100 g.) was polymerized with 750 mg. of indium trichloride catalyst using the procedure described in Example 1. After the polymerization had proceeded at 120° C. for 19 hours, the resulting solution of anhydride terminated poly(phenyl ether) sulfone was allowed to cool to 80° C. and degassed by application of an aspirator vacuum. The solution was then diluted with 200 g. of dimethylacetamide to give a 25% solids solution.

In a jar containing 37.4 g. dimethylacetamide was dissolved 3.364 g. (0.0168 mole) of oxydianiline, 3.420 g. (0.0160 mole) of pyromellitic dianhydride was added and the mixture was shaken vigorously until all of the anhydride compound had dissolved. After the mixture had been left standing at room temperature for 2 hours, 40.0 g. of the sulfone polymer solution described above (containing 10 g. of polymer with 0.0016 mole of terminal anhydride groups) was added and the mixture was vigorously shaken. A considerable increase in solution viscosity was observed. The resulting polyaryl-sulfone-amide acid block copolymer solution was used to cast films. Removal of the dimethylacetamide solvent and conversion of the amide acid chain blocks to polyimide blocks was accomplished by heating at 65° to 260° C. with approximately a 28° C. temperature increase every 30 minutes. The resulting film of block copolymer consisting of 62% polyarylsulfone and 38% polyimide was subjected to the MIT fold endurance test. An average of 500 folds were measured for a 1 mil film thickness.

What is claimed is:
1. A graft copolymer comprising
   (1) 25 to 99 percent by weight of a polyarylsulfone backbone consisting of alternating sulfonyl and aromatic groups containing not more than 20 carbon atoms each, the aromatic groups consisting of six membered aromatic carbocycles and carbocycle linking groups selected from —O—, —S— and —CH₂—, said backbone being a derivative of a substantially linear polyarylsulfone which has carboxy anhydride groups on the main chain thereof, which is soluble in concentrations up to 10 percent in phenol at 175° C. and in which the molar ratio of the anhydride to sulfone groups ranges from 0.005 to 1 and
   (2) 1 to 75 percent by weight of polyamide acid side chains,
wherein the polyamide acid side chains are joined to the polyarylsulfone backbone through nitrogen atoms bonded directly to a carbonyl group derived from an anhydride group of the polyarylsulfone precursor.
2. A graft copolymer according to claim 1 wherein the molar ratio of anhydride to sulfone groups in the linear polyarylsulfone precursor ranges from 0.01 to 0.30.
3. A graft copolymer according to claim 1 wherein the polyamide acid side chains are reaction products of oxydianiline and pyromellitic dianhydride.
4. A graft copolymer comprising
   (1) 25 to 99 percent by weight of a polyarylsulfone backbone consisting of alternating sulfonyl and aromatic groups containing not more than 20 carbon atoms each, the aromatic groups consisting of six membered aromatic carbocycles and carbocycle linking groups selected from —O—, —S— and —CH₂—, said backbone being a derivative of a substantially linear polyarylsulfone which has carboxy anhydride groups on the main chain thereof, which is soluble in concentrations up to 10 percent in phenol at 175° C. and in which the molar ratio of the anhydride to sulfone groups ranges from 0.005 to 1 and
   (2) 1 to 75 percent by weight of polyimide side chains, wherein the polyimide side chains are joined to the polyarylsulfone backbone through nitrogen atoms bonded directly to both carbonyl groups derived from an anhydride group of the polyarylsulfone precursor.
5. A graft copolymer according to claim 4 wherein the molar ratio of anhydride to sulfone groups in the linear polyarylsulfone precursor ranges from 0.01 to 0.30.
6. A graft copolymer according to claim 4 wherein the polyimide side chains are reaction products of oxydianiline and pyromellitic dianhydride.
7. A block copolymer comprising
   (1) 25 to 99 percent by weight of polyarylsulfone segments consisting of alternating sulfonyl and aromatic groups containing not more than 20 carbon atoms each, the aromatic groups consisting of six membered aromatic carbocycles and carbocycle linking groups selected from —O—, —S— and —CH₂—, said segments being derivatives of a substantially linear polyarylsulfone which has terminal carboxy anhydride groups on the main chain thereof, which is soluble in concentrations up to 10 percent in phenol at 175° C. and in which the molar ratio of the anhydride to sulfone groups ranges from 0.005 to 1 and
   (2) 1 to 75 percent by weight of polyamide acid segments,
wherein the polyarylsulfone and polyamide acid segments are joined through nitrogen atoms bonded directly to a carbonyl group derived from an anhydride group of the polyarylsulfone precursor.
8. A block copolymer according to claim 7 wherein the molar ratio of anhydride to sulfone groups in the linear polyarylsulfone precursor ranges fom 0.01 to 0.15.
9. A block copolymer according to claim 7 wherein the polyamide acid segments are reaction products of oxydianiline and pyromellitic dianhydride.
10. A block copolymer comprising
   (1) 25 to 99 percent by weight of polyarylsulfone segments consisting of alternating sulfonyl and aromatic groups containing not more than 20 carbon atoms each, the aromatic groups consisting of six membered aromatic carbocycles and carbocycle linking groups selected from —O—, —S— and —CH₂—, said segments being derivatives of a substantially linear polyarylsulfone which has terminal carboxy anhydride groups on the main chain thereof, which is soluble in concentrations up to 10 percent in phenol at 175° C. and in which the molar ratio of the anhydride to sulfone groups ranges from 0.005 to 1 and
   (2) 1 to 75 percent by weight of polyimide segments, wherein the polyarylsulfone and polyimide segments are joined through nitrogen atoms bonded directly to both carbonyl groups derived from an anhydride group of the polyarylsulfone precursor.
11. A block copolymer according to claim 10 wherein the molar ratio of anhydride to sulfone groups in the linear polyarylsulfone precursor ranges from 0.01 to 0.15.
12. A block copolymer according to claim 10 wherein the polyimide segments are reaction products of oxydianiline and pyromellitic dianhydride.

References Cited
UNITED STATES PATENTS

| | | | |
|---|---|---|---|
| 3,321,449 | 5/1967 | Vogel | 260—79.3 |
| 3,393,181 | 7/1968 | Vogel | 260—79.3 |
| 3,406,149 | 10/1968 | Vogel | 260—49 |

PAUL LIEBERMAN, Primary Examiner

U.S. Cl. X.R.

260—49, 79.3 R, 79.3 A, 823, 830 S, 860